UNITED STATES PATENT OFFICE.

JOHN KIRBY, OF PITTSBURGH, PENNSYLVANIA.

METHOD OF TREATING IRON.

1,079,129. Specification of Letters Patent. Patented Nov. 18, 1913.

No Drawing. Application filed October 11, 1912. Serial No. 725,200.

*To all whom it may concern:*

Be it known that I, JOHN KIRBY, a citizen of the United States of America, residing at Pittsburgh, in the county of Allegheny and State of Pennsylvania, have invented certain new and useful Improvements in Methods of Treating Iron, of which the following is a specification.

This invention relates to a method of treating iron and has for its object to provide a method, in a manner as hereinafter set forth, to incorporate vanadium in muck iron to increase the tensile strength of the latter.

Briefly described the method consists in feeding into a heat of muck iron contained in a puddling furnace about the time the cinder is boiled off and before the iron is ready to ball, a composition including vanadium oxid combined with a reducing agent and an agent to increase the combustion of the reducing agent, whereby the vanadium oxid will be reduced and be caused to thoroughly incorporate with the iron thereby increasing the tensile strength of the latter.

A composition capable of carrying the method into effect consists of oxid of vanadium, pulverized or granulated aluminum, iron rust, potassium chlorate, black oxid of manganese and with or without barium dioxid.

The ingredients of the foregoing composition are thoroughly mixed together and the preferred proportions of each ingredient by weight is as follows: oxid of vanadium 1 part, aluminum $\frac{1}{4}$ to $\frac{1}{2}$ part, iron rust $\frac{1}{4}$ part, potassium chlorate $\frac{1}{10}$ part, black oxid of manganese $\frac{1}{20}$ part, and if the barium dioxid is employed $\frac{1}{20}$ part. The composition is fed in the muck iron when the cinders are wholly or partly boiled off and up to before the time to ball.

If the heat should at any time be too intense, manure and salt may be added, such addition reducing the heat and holding the iron in a thick mucky condition, the latter condition of the iron being the first state that the iron gets into when it changes from metallic pig iron into muck iron. The reaction of aluminum and the iron rust generates sufficient heat for the aluminum to react upon the oxid of vanadium to reduce it.

The potassium chlorate and black oxid of manganese with or without barium dioxid, throws off a pure oxygen which starts the combustion of the aluminum to reduce the vanadium. The reduction of the vanadium in the muck iron due to the reaction of the aluminum and iron rust, changes the oxid of vanadium into metallic vanadium.

What I claim is:—

1. A method of increasing the tensile strength of iron consisting in feeding into a heat of muck iron about the time the cinder is partly or wholly boiled off and before the time to ball, a composition including oxid of vanadium and aluminum.

2. A method of increasing the tensile strength of iron consisting in feeding into a heat of muck iron about the time the cinder is partly or wholly boiled off and up to before the time to ball, a composition including oxid of vanadium and a reducing agent therefor.

3. A method of increasing the tensile strength of iron consisting in feeding into a heat of muck iron about the time the cinder is partly or wholly boiled off and up to before the time to ball, a composition including oxid of vanadium, and a reducing agent therefor, and then holding the heat to maintain the iron in a thick mucky condition.

4. A method of increasing the tensile strength of iron consisting in feeding into a heat of iron about the time the cinder is partly or wholly boiled off oxid of vanadium and aluminum.

5. A method of increasing the tensile strength of iron consisting in feeding into a heat of iron about the time the cinder is partly or wholly boiled off oxid of vanadium and aluminum, and then governing the heat to hold the iron in a thick mucky condition.

6. A method of increasing the tensile strength of iron consisting in feeding into a heat of iron about the time the cinder is partly or wholly boiled off a composition including oxid of vanadium, aluminum and iron rust.

In testimony whereof I affix my signature in the presence of two witnesses.

JOHN KIRBY.

Witnesses:
MAX H. SROLOVITZ,
KATHERINE ERRETT.